United States Patent [19]

Lewis et al.

[11] Patent Number: 4,557,413
[45] Date of Patent: Dec. 10, 1985

[54] HEAT PIPE FABRICATION

[75] Inventors: Wallace J. Lewis; David R. Bolser, both of Florissant, Mo.

[73] Assignee: McDonnell Douglas, St. Louis, Mo.

[21] Appl. No.: 598,714

[22] Filed: Apr. 11, 1984

[51] Int. Cl.⁴ .............................................. B23K 31/02
[52] U.S. Cl. .................................. 228/183; 228/193; 228/243
[58] Field of Search ............... 228/183, 193, 243, 130; 165/104.26; 29/157.3 AH

[56] References Cited

U.S. PATENT DOCUMENTS

| | | | |
|---|---|---|---|
| 3,121,949 | 2/1964 | Wright | 29/471.5 |
| 3,466,737 | 9/1969 | Hanink | 29/492 |
| 3,834,457 | 9/1974 | Madison | 165/104.26 |
| 3,964,902 | 6/1976 | Fletcher | 165/104.26 |
| 4,034,454 | 7/1977 | Galasso et al. | 428/576 |
| 4,046,190 | 9/1977 | Marcus | 165/104.26 |
| 4,109,131 | 8/1978 | Schluter | 219/75 |

FOREIGN PATENT DOCUMENTS 56-71590  6/1981  Japan .

Primary Examiner—Nicholas P. Godici
Assistant Examiner—G. M. Reid
Attorney, Agent, or Firm—Gravely, Lieder & Woodruff

[57] ABSTRACT

A method of eutectic bonding of a stainless steel fine mesh screen directly to a surface of a titanium member by cleaning the surfaces of the screen and member and subjecting those parts to pressure to secure an intimate contact and heat to effect the bonding thereof without destroying the integrity of the screen and adversely affecting the wicking action of the screen which is of prime importance.

14 Claims, 3 Drawing Figures

HEAT PIPE FABRICATION

BACKGROUND OF THE INVENTION

1. Field of the Invention

This invention is directed to fabricating a wick system in a heat pipe by the eutectic bonding of a wick screen to the interior of a heat pipe body, and more particularly to the eutectic bonding of a stainless steel screen to the surface of a titanium pipe.

2. Description of the Prior Art

The joining of dissimilar metals is fairly well documented in methods of brazing as by an interlayer of a material which functions as a eutectic alloying agent. An example of this formation of bonding is seen in Galasso et al U.S. Pat. No. 4,034,454 of July 12, 1977. An example of joining titanium and titanium alloys using a brazing material can be found in Hanink U.S. Pat. No. 3,466,737 of Sept. 16, 1969. A further example of joining titanium and steel is found in Japanese Pat. No. 56-71590(A) of June 15, 1981 by Takashi Oomae. Additionally, the patent of Wright U.S. Pat. No. 3,121,949 of Feb. 25, 1964 is directed to a method for manufacturing titanium clad steel.

None of the foregoing examples is concerned with the bonding of stainless steel to titanium by the direct contact of these two materials. The prior art is generally directed to the use of an interlayer of material which functions as a eutectic alloying agent. However, in the fabrication of heat pipes where a wick system on the interior of the heat pipe is an important requirement, the teaching of the foregoing prior art fails to provide the necessary guidance.

The design of heat pipe systems requires the placement of a fine metal screen or wick in fixed position on the interior surface of a metal tube. The screen is normally 200–400 mesh with very small openings which does not lend itself to conventional welding processes as a significant portion of the screen is destroyed. Furthermore, conventional brazing methods are not acceptable because of the uncontrollable capillary action of the brazing alloy which fills the screen openings. When resort to mechanical attachment of the screen to the tube is had, spaces between the screen and the tube wall occur which lowers the wicking efficiency of the heat pipe.

SUMMARY OF THE INVENTION

The present fabrication technique overcomes the above described problems and disadvantages. In accordance with the principles of the present invention, a unique method of joining stainless steel screen to titanium heat pipe tubes relies upon eutectic bonding so the wicking efficiency is not affected and the fine mesh screen is not destroyed.

Furthermore, it is an important object to obtain eutectic bonding directly between the surface of a titanium heat pipe and a stainless steel screen at the points of contact of the screen with the titanium pipe so the wicking function of the screen is not impared.

Other objects of the present invention are directed to the fabrication of heat pipes for space craft applications where it is important to conduct large amounts of heat from a heat generating source to a heat dissipating place with small heat losses during the transmission by the capillary action of the wick, and wherein the heat pipe tube is formed from titanium and the wick is stainless steel.

BRIEF DESCRIPTION OF THE DRAWINGS

A preferred embodiment of the present invention is illustrated in the accompanying drawings, wherein.

DETAILED DESCRIPTION OF THE EMBODIMENT

In the fabrication of a fine mesh stainless steel screen to a heat pipe of titanium, the preferred process consists of chemically cleaning the stainless steel screen and the interior surface of the titanium tube, placing the screen against the interior wall and holding the screen in place with a mandrel to support and press the screen into firm and intimate contact with the titanium at points where the wires forming the screen cross over each other. The tube with the screen in place by the mandrel is placed in an electric furnace or suitable heating chamber so that the chamber can be evacuated in order not to adversely affect the joining of the two metals by eutectic bonding. The heat required to produce the desired eutectic bonding is of the order of 1800° to 2000° F. The heating chamber should be evacuated, although an inert gas may be used.

Figure 3:
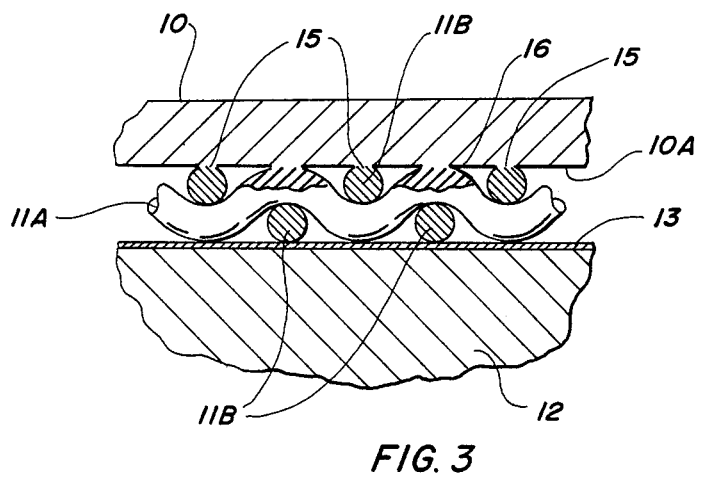
FIG. 3 is a greatly enlarged fragmentary detail view of the screen held by the mandrel against the tube wall.

In the drawing views, the heat pipe to be fabricated is a titanium tube 10 which may be formed of a commercial titanium alloy. A stainless steel fine mesh screen 11 is placed against the interior surface of the tube 10 to form a wick for whatever fluid is going to be used. The screen is normally a 200 mesh type with small openings, and the strands are held in point contact against the tube surface by a mandrel 12 which has a surface coating of an oxide or stop-off material 13 to prevent the screen 11 adhering to the mandrel. The screen 11 is joined to the tube 10 by eutectic bonding as seen in FIG. 3 where only the contact of the longitudinal screen strands 11a and transverse strands 11b with the tube surface 10a are intimately joined without filling the screen interstices which would block the capillary action that is necessary for the proper wicking function in a heat pipe.

Figure 1:
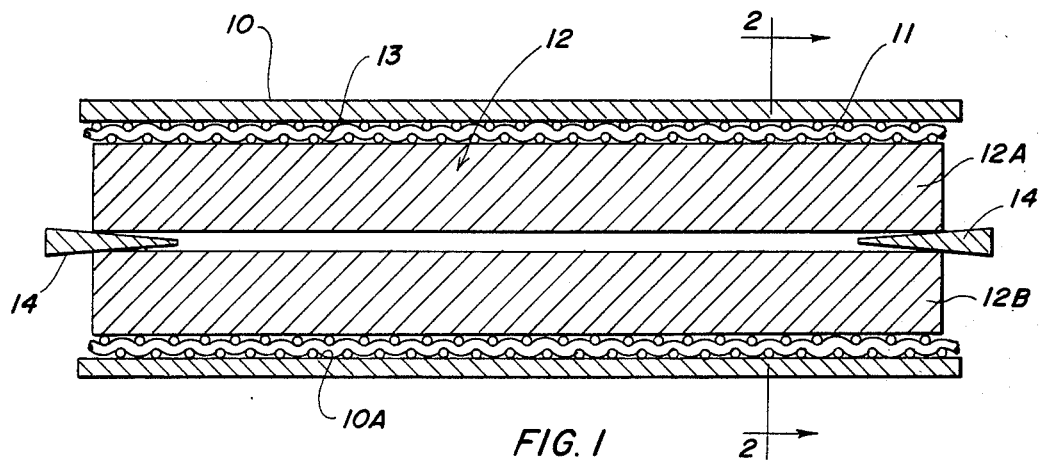
FIG. 1 is a longitudinal sectional view of a heat pipe in which the screen is held by a split mandrel wedged into position preparatory to eutectic bonding of the screen to the tube.
Figure 2:
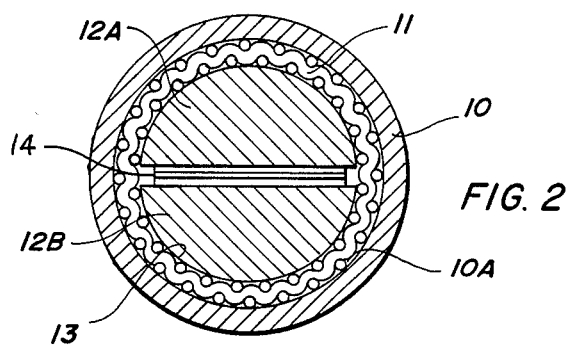
FIG. 2 is a transverse sectional view taken along line 2—2 in FIG. 1.

In FIGS. 1 and 2, the fabrication of a wick screen 11 to the interior surface 10a of the tube 10 is accomplished by inserting a mandrel tool 12 to intimately hold the screen 11 in contact against surface 10a. The intimate contact along the length and circumference of the screen 11 is achieved by dividing the mandrel into two or more parts, and in this example the parts 12a and 12b, and using wedges 14 to press the mandrel parts during the eutectic bonding of the screen 11 and tube 12. The tube 10 may have a length of several feet and in order to hold the screen 11 against the ID of the tube 10, the mandrel is formed of a material that has no eutectic bonding reaction with the screen 11, but has a higher coefficient of expansion than the screen 11 and tube 10 so it develops a substantially uniform supporting pressure against the screen so the strands of the screen are intimately in contact throughout the surface of the tube ID. During the heating step of the method, the strands 11a and 11b, where they contact the surface 10a, form a bond denoted by the eutectic zones 15 and the fillets 16, as shown in FIG. 3.

Our invention is directed to the joining of stainless steel screening 11 to the interior surface 10a of a titanium tube 10 by the technique of eutectic bonding. It is known that stainless steel and titanium form a eutectic. However, it is not taught by the prior art that stainless steel can be bonded directly to titanium and without some interleaving film of material either as a brazing alloy or an electro-plated or vacuum plated surface. It is known that when an interleaving material is disposed between a stainless steel screen having a 200 to 400 mesh and a titanium tube it plugs the interstices of the screen thereby rendering it unsuitable for developing capillary action required for a heat pipe.

This invention has been carried out with commercial alloy of titanium. As an example, the alloy contained about 3% aluminum and about 2.5% vanadium, and the stainless steel screen of 200 mesh exhibited the characteristics of AISI No. 304L stainless steel which is austenitic and contains high nickel content. Type 304L has a carbon content of not in excess of 0.03 percent so it is practically free of susceptibility to corrosion. The foregoing materials in flat form were suitably cleaned chemically, and a pressure exerting ceramic block held the screen in intimate contact during the heating stage. A successful bond was achieved. Instead of a ceramic block, a high temperature nickel or cobalt base alloy with a boron nitride coating as a stop-off can be used. The foregoing components of titanium and stainless steel were bonded in a vacuum at elevated temperature. These several characteristics of titanium and stainless steel are preferred from which to fabricate heat pipes, and are quite stable in the presence of the heat transfer medium used in heat pipes, such as water, any of the Freons, or ammonia, or any other appropriate working fluid.

In the practice of the process of fabricating a heat pipe, the steps of cleaning the titanium tube ID and the stainless steel screen, the polishing of the tube ID when found necessary to obtain a contact surface for the strands of the screen, the selection of a high temperature nickel or cobalt base alloy for the mandrel due to its higher coefficient of expansion than that for the tube and screen, and the interposition of a stop-off between the mandrel and screen are important to the attainment of success. The bonding temperature levels vary from about 1800° F. to about 2000° F., which includes the temperature range of the components noted above, is well below the melting temperature of titanium which occurs at about 3300° F., and below the melting temperature of stainless steel which occurs at about 2600° F. These known melting temperatures are well below the range at which eutectic bonding occurs so that loss of form of the components is not a problem.

While a preferred embodiment of the present invention has been described in the foregoing specification, it is understood that various modifications and substitutions in the method of effecting eutectic bonding of the stainless steel screen to the interior surface of a titanium tube may come to mind without departing from the spirit and scope of the invention. It is to be understood that the present invention is predicated upon the direct contact and eutectic bonding between the strand elements of a stainless steel screen and the surfaces of a titanium tube during the retention of the screen in intimate contact with the titanium tube.

What is claimed is:

1. A method of joining a stainless steel screen wick to a titanium heat pipe tube, the method comprising the steps of:
   (a) removing contaminants from the surface of both the titanium tube component and stainless steel screen wick component;
   (b) disposing the stainless steel screen wick component against a surface of the titanium tube component to provide point contact therebetween;
   (c) holding the stainless steel screen wick component in intimate contact with a surface of the titanium tube component;
   (d) bringing the asembled titanium tube and stainless steel screen wick components in an inert atmosphere up to a temperature within a range which varies between 1800° F. and 1950° F.; and
   (e) maintaining the temperature within said range for substantially 15 minutes to obtain eutectic bonding of the stainless steel screen wick component to said titanium tube component.

2. The method of claim 1 wherein the titanium is selected from a commercial titanium alloy.

3. The method of claim 1 wherein the stainless steel screen is formed from the class of austenitic stainless steel.

4. The method of claim 1 wherein a pressure exerting tool holds the stainless steel screen wick component in the intimate contact with the titanium tube component.

5. The method of claim 1 wherein the assembled titanium tube and stainless steel screen wick components are brought up to temperature in an evacuated chamber.

6. The method of claim 4 wherein the pressure exerting tool is given a surface treatment which prevents bonding to the stainless steel.

7. In the fabrication of a heat pipe having a screen wick therein the method of eutectic bonding a screen wick of stainless steel to the inner surface of titanium tubing which consists in
   (a) cleaning the stainless steel screen wick and titanium tubing in a pickling bath to remove contaminants;
   (b) providing a mandrel of a high temperature nickel or cobalt base alloy having a stop-off surface treatment;
   (c) using the mandrel to hold the stainless steel screen wick in substantial screen point contact with the interior surface of the titanium tube; and
   (d) effecting the eutectic bonding of the tube and screen wick at the point contact therebetween in a non-contaminating atmosphere at a temperature of the order of about 1850° F. for about fifteen minutes before removal from the heated atmosphere.

8. A method of joining a stainless steel screen wick having longitudinal and transverse strands to the interior surface of a pipe of titanium comprising:
   (a) removing contaminants from the screen wick strands and surface of the pipe;
   (b) assembling the screen wick inside the pipe;
   (c) holding the screen wick strands by a mandrel in intimate contact with the inner surface of the pipe to establish point contact between the strands and the pipe surface;
   (d) bringing the assembled screen wick and pipe up to a temperature within a range sufficient to obtain eutectic bonding of the screen wick strands into the surface of the pipe; and (e) maintaining the temperature for a time to assure the eutectic point contact bonding of the screen wick strands.

9. The method according to claim 8 in which the temperature is in the range of 1800° F. to 1950° F.

10. The method according to claim 8 in which the mandrel is selected from material having a higher coefficient of expansion than either the pipe or screen wick.

11. The method according to claim 8 in which a bond inhibiting coating is applied to the mandrel.

12. The method according to claim 8 in which the removing of contaminants from the screen wick and pipe is by chemical cleaning.

13. The method according to claim 8 in which the titanium pipe is selected from an alloy containing about 3% aluminum and about 2.5% vanadium; and the stainless steel screen wick is selected from a screen of about 200 mesh and exhibits the characteristics of ASIS No. 304L stainless steel which contains not in excess of about 0.03% carbon content.

14. The method according to claim 8 in which the eutectic bonding temperatures are below the melting temperature of the screen wick so that loss of the strand form is not reached.

* * * * *